United States Patent
Liu (10) Patent No.: US 12,259,484 B2
(45) Date of Patent: Mar. 25, 2025

(54) POSITIONING PROCESSING METHOD AND APPARATUS, BASE STATION, TERMINAL DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 375 days.

(21) Appl. No.: 17/759,001

(22) PCT Filed: Jan. 20, 2020

(86) PCT No.: PCT/CN2020/073255
§ 371 (c)(1),
(2) Date: Jul. 18, 2022

(87) PCT Pub. No.: WO2021/146847
PCT Pub. Date: Jul. 29, 2021

(65) Prior Publication Data
US 2023/0034681 A1    Feb. 2, 2023

(51) Int. Cl.
*H04W 64/00* (2009.01)
*G01S 5/00* (2006.01)
*H04L 5/00* (2006.01)
*H04W 60/04* (2009.01)

(52) U.S. Cl.
CPC ......... *G01S 5/0054* (2013.01); *H04L 5/0051* (2013.01); *H04W 60/04* (2013.01); *H04W 64/00* (2013.01)

(58) Field of Classification Search
CPC .................................................. H04W 64/00
See application file for complete search history.

(56) References Cited

U.S. PATENT DOCUMENTS

| | | | |
|---|---|---|---|
| 2017/0142682 A1* | 5/2017 | Gunnarsson | G01S 1/20 |
| 2017/0318554 A1 | 11/2017 | Kim | |
| 2017/0332342 A1 | 11/2017 | Lu et al. | |

FOREIGN PATENT DOCUMENTS

| | | |
|---|---|---|
| CN | 104469930 A | 3/2015 |
| CN | 104469931 A | 3/2015 |
| CN | 106211323 A | 12/2016 |
| CN | 106772233 A | 5/2017 |

(Continued)

OTHER PUBLICATIONS

International Search Report issued Oct. 21, 2020 in PCT/CN2020/073255, filed on Jan. 20, 2020, 2 pages.

(Continued)

*Primary Examiner* — Kevin Kim
(74) *Attorney, Agent, or Firm* — Oblon, McClelland, Maier & Neustadt, L.L.P.

(57) ABSTRACT

A positioning processing method applied to a base station is provided. The positioning processing method includes: receiving a first positioning reference signal from a first terminal device; receiving a second positioning reference signal from a second terminal device bound to the first terminal device; determining position information of the first terminal device based on the first positioning reference signal and the second positioning reference signal; and sending the position information to at least one of the first terminal device or the second terminal device.

20 Claims, 6 Drawing Sheets

(56) References Cited

FOREIGN PATENT DOCUMENTS

| | | |
|---|---|---|
| CN | 107426742 A | 12/2017 |
| CN | 110505684 A | 11/2019 |
| WO | WO 2016/076644 A1 | 5/2016 |

OTHER PUBLICATIONS

Chinese Office Action and Search Report Issued in Application No. 2020800001493, Dec. 15, 2020, 16 pages (Submitted with Machine/Partial Translation).
Chinese Office Action and Search Report Issued in Application No. 2020800001493, Jun. 4, 2021, 14 pages (Submitted with Machine/Partial Translation).
Chinese Office Action and Search Report Issued in Application No. 2020800001493, Oct. 11, 2021, 12 pages (Submitted with Machine/Partial Translation).

\* cited by examiner

POSITIONING PROCESSING METHOD AND APPARATUS, BASE STATION, TERMINAL DEVICE, AND STORAGE MEDIUM

CROSS REFERENCE TO RELATED APPLICATIONS

The present application is a U.S. National Stage of International Application No. PCT/CN2020/073255 filed on Jan. 20, 2020, the contents of which are incorporated herein by reference in its entireties for all purposes.

TECHNICAL FIELD

The present disclosure relates to the field of communication technologies, and in particular, to a positioning processing method and apparatus, a base station, a terminal device, and a storage medium.

BACKGROUND

Currently, there are usually two types of positioning technologies, one of which is based on satellite, such as Global Position System (GPS), and the other one of which is based on wireless communication network, such as wifi or communication network. In the positioning technologies based on the wireless communication network, a positioning technology based on a cellular communication network has been standardized for a long time, but is rarely commercialized. This is because the positioning accuracy of communication signals is not high, and the transformation of network and user equipment requires a certain cost.

However, in 5G high-frequency communication, a coverage radius of base stations is relatively small, which provides an objective opportunity for development of the positioning technologies based on the wireless communication network.

SUMMARY

In examples of the present disclosure, a positioning processing method and apparatus, a base station, a terminal device, and a storage medium.

According to a first aspect of the examples of the present disclosure, there is provided a positioning processing method, applied to a base station, and including:
  receiving a first positioning reference signal from a first terminal device;
  receiving a second positioning reference signal from a second terminal device bound to the first terminal device;
  determining position information of the first terminal device based on the first positioning reference signal and the second positioning reference signal; and
  sending the position information to at least one of the first terminal device or the second terminal device.

In the above solution, determining the position information of the first terminal device based on the first positioning reference signal and the second positioning reference signal includes:
  determining the position information based on a weighted average of the first positioning reference signal and the second positioning reference signal.

In the above solution, the first positioning reference signal has a first weight for calculating the weighted average, and the second positioning reference signal has a second weight for calculating the weighted average, where the first weight is greater than the second weight.

In the above solution, the method further includes:
  sending resource information of time-frequency resources configured by the base station to the first terminal device and the second terminal device;
  receiving the first positioning reference signal from the first terminal device includes:
  within the time-frequency resources, receiving the first positioning reference signal reported by the first terminal device;
  receiving the second positioning reference signal from the second terminal device bound to the first terminal device includes:
  within the time-frequency resources, receiving the second positioning reference signal reported by the second terminal device.

In the above solution, the method further includes:
  receiving a registration request; and
  binding the first terminal device and the second terminal device based on the registration request.

According to a second aspect of the examples of the present disclosure, there is provided a positioning processing method, applied to a first terminal device, and including:
  sending a first positioning reference signal from the first terminal device to a base station; and
  receiving position information returned by the base station, where the position information is determined by the base station based on the first positioning reference signal and a second positioning reference signal, where the second positioning reference signal is sent by a second terminal device bound to the first terminal device.

In the above solution, the method further includes:
  sending a joint positioning request to the second terminal device;
  sending the first positioning reference signal from the first terminal device to the base station includes:
  in response to receiving a joint positioning response returned by the second terminal device based on the joint positioning request, sending the first positioning reference signal to the base station.

In the above solution, sending the joint positioning request to the second terminal device includes:
  sending the joint positioning request to the second terminal device based on a cellular communication network; or
  sending the joint positioning request to the second terminal device based on a Bluetooth connection.

In the above solution, the method further includes:
  sending the position information to the second terminal device.

In the above solution, the method further includes:
  receiving resource information of time-frequency resources from the base station;
  sending the first positioning reference signal from the first terminal device to the base station includes:
  within the time-frequency resources, reporting the first positioning reference signal to the base station.

According to a third aspect of the examples of the present disclosure, there is provided a positioning processing method, applied to a second terminal device, and including:
  sending a second positioning reference signal from the second terminal device to a base station; and
  receiving position information, where the position information is determined by the base station based on the second positioning reference signal and a first positioning reference signal, where the first positioning reference signal is sent by a first terminal device bound to the second terminal device.

In the above solution, before sending the second positioning reference signal from the second terminal device to the base station, the method further includes:

receiving a joint positioning request from the first terminal device; and sending a joint positioning response determined based on the joint positioning request to the first terminal device.

In the above solution, receiving the joint positioning request from the first terminal device includes:

receiving the joint positioning request from the first terminal device based on a cellular communication network; or receiving the joint positioning request from the first terminal device based on a Bluetooth connection.

In the above solution, receiving the position information includes:

receiving the position information from the base station.

In the above solution, receiving the position information includes:

receiving the position information from the first terminal device.

In the above solution, the method further including:

receiving resource information of time-frequency resources from the base station;

sending the second positioning reference signal from the second terminal device to the base station includes:

within the time-frequency resources, reporting the second positioning reference signal to the base station.

According to a fourth aspect of the examples of the present disclosure, there is provided a base station, including:

a first processor; and a first memory for storing first processor executable instructions, where the first processor is configured to execute the executable instructions to implement the positioning processing method applied to the base station according to any one of examples of the present disclosure.

According to a fifth aspect of the examples of the present disclosure, there is provided a first terminal device, including:

a second processor; and a second memory for storing second processor executable instructions, where the second processor is configured to execute the executable instructions to implement the positioning processing method applied to the first terminal device according to any one of examples of the present disclosure.

According to a sixth aspect of the examples of the present disclosure, there is provided a second terminal device, including:

a third processor; and a third memory for storing third processor executable instructions;

where the third processor is configured to execute the executable instructions to implement the positioning processing method applied to the second terminal device according to any one of examples of the present disclosure.

According to a seventh aspect of the examples of the present disclosure, there is provided a computer storage medium having a computer executable program stored thereon, where the executable program is executed by a processor to implement the positioning processing method according to any one of examples of the present disclosure.

The technical solutions according to the examples of the present disclosure can have the following beneficial effects:

In the examples of the present disclosure, the position information of the first terminal device can be determined through the acquired positioning reference signals of the first terminal device and the second terminal device having a binding relationship, so that the first terminal device can be assisted by the second terminal device to realize the repositioning of the first terminal device, and improve the positioning accuracy of the first terminal device. In particular, a position of the first terminal device in an indoor environment can be further corrected, which improves the accurate positioning of the first terminal device.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information.

Figure 1:
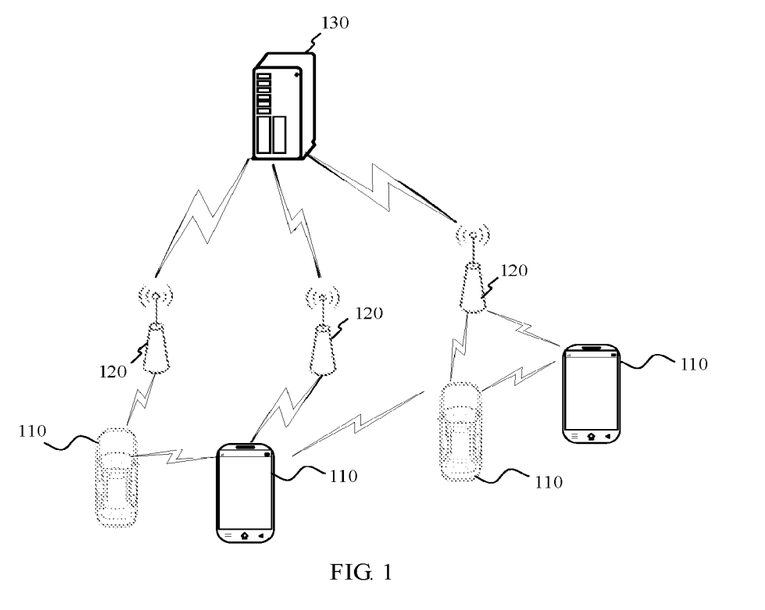
FIG. 1 is a schematic structural diagram illustrating a wireless communication system.

FIG. 1 is a schematic structural diagram illustrating a wireless communication system according to an example of the present disclosure. As shown in FIG. 1, the wireless communication system is a communication system based on a cellular mobile communication technology. The wireless communication system may include: a plurality of user equipment 110 and a plurality of base stations 120.

The user equipment 110 may refer to devices that provide voice and/or data connectivity to users. The user equipment 110 may communicate with one or more core networks through a Radio Access Network (RAN). The user equipment 110 may include Internet of Things (IoT) user equipment, such as sensor devices and mobile phones (or referred to as "cellular" phones); and computers having the IoT user equipment, such as stationary apparatuses, portable apparatuses, pocket-sized apparatuses, hand-held apparatuses, built-in-computer apparatuses or vehicle-mounted apparatuses. In some examples, the user equipment 110 may include Stations (STAs), subscriber units, subscriber stations, mobile stations, mobiles, remote stations, access points, remote terminals, access terminals, user terminals, user agents, user devices, or other user equipment. In some examples, the user equipment 110 may include unmanned aerial vehicles or the like. In some examples, the user equipment 110 may include in-vehicle devices, such as trip computers with a wireless communication function, or wireless user equipment connected to an external trip computer. In some examples, the user equipment 110 may include roadside devices, such as street lights or signal lights with a wireless communication function.

The base stations 120 may include network side devices in a wireless communication system. The wireless communication system may be a 4th Generation Mobile Communication (4G) system, which is known as a Long Term Evolution (LTE) system. In some examples, the wireless communication system may be a 5G system, which is known as a New Radio system or a 5G NR system. In some examples, the wireless communication system may be a next generation system of the 5G system. An access network in the 5G system may be referred to as New Generation-Radio Access Network (NG-RAN).

The base stations 120 may include evolved base stations (eNBs) used in a 4G system. In some examples, the base stations 120 may include base stations (gNBs) with a central-distributed architecture used in a 5G system. When the base stations 120 adopt the central-distributed architecture, a Central Unit (CU) and at least two Distributed Units (DUs) are usually included. The CU is provided with a protocol stack of a Packet Data Convergence Protocol (PDCP) layer, a Radio Link Control (RLC) layer, and a Media Access Control (MAC) layer. The DUs are provided with a protocol stack of a Physical (PHY) layer. The specific implementation manner for the base stations 120 is not limited in the examples of the present disclosure.

A wireless connection can be established between the base stations 120 and the user equipment 110 through a wireless air interface. In different examples, the wireless air interface is a wireless air interface based on a 4G standard. In some examples, the wireless air interface is a wireless air interface based on a 5G standard. For example, the wireless air interface is new radio. In some examples, the wireless air interface may be a wireless air interface based on a next generation mobile communication standard of 5G.

In some examples, an End to End (E2E) connection can be established between the user equipment 110, for example, in Vehicle to Vehicle (V2V) communication, Vehicle to Infrastructure (V2I) communication, Vehicle to Pedestrian (V2P) communication or other scene communication from Vehicle to Everything (V2X) communication.

Here, terminal devices in the following examples can be regarded as the user equipment.

In some examples, the wireless communication system may further include a network management device 130.

A plurality of base stations 120 are respectively connected to the network management device 130. The network management device 130 may be a core network device in the wireless communication system. For example, a network management device 130 may be a Mobility Management Entity (MME) in an Evolved Packet Core (EPC) network. In some examples, the network management device may be other core network device, such as a Serving GateWay (SGW), a Public Data Network GateWay (PGW), a Policy and Charging Rules Function (PCRF) or a Home Subscriber Server (HSS). The implementation manner for the network management device 130 is not limited in the examples of the present disclosure.

Figure 2:
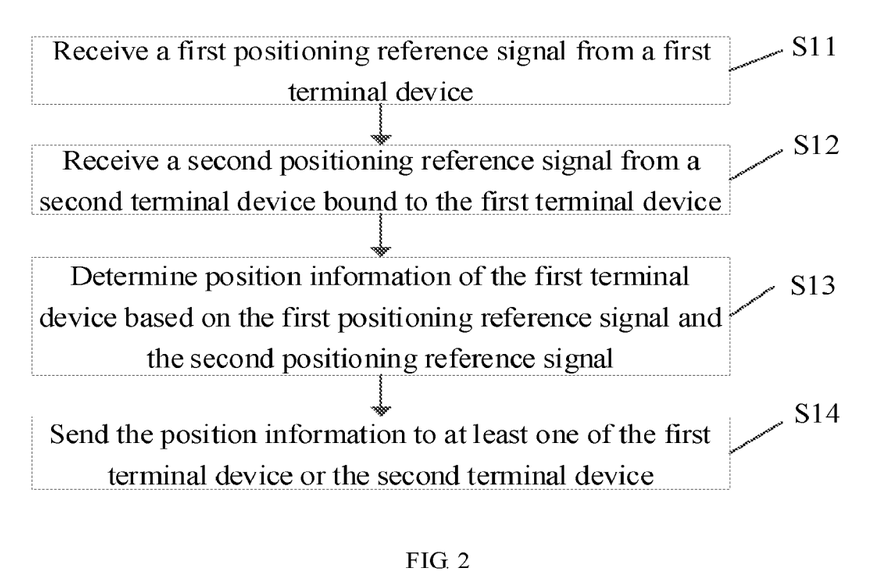
FIG. 2 is a flowchart illustrating a positioning processing method according to an example.

As shown in FIG. 2, in an example of the present disclosure, a positioning processing method is provided. The method includes the following steps:

at step S11, a first positioning reference signal is received from a first terminal device;

at step S12, a second positioning reference signal is received from a second terminal device bound to the first terminal device;

at step S13, position information of the first terminal device is determined based on the first positioning reference signal and the second positioning reference signal; and at step S14, the position information is sent to at least one of the first terminal device or the second terminal device.

The positioning processing method described in the examples of the present disclosure is applied to a base station. Here, the base station is an access device for user equipment to access a cellular mobile network. The base station may include various types of base stations, for example, a 3G base station, a 4G base station, or a 5G base station.

In the examples of the present disclosure, the step S11 includes: receiving the first positioning reference signal from the first terminal device based on a cellular communication network. The step S12 includes: receiving the second positioning reference signal from the second terminal device based on the cellular communication network.

Here, both the first terminal device and the second terminal device may be a mobile phone, a computer, a server, a transceiver device, a tablet device, a medical device, a wearable device, or the like.

In an example, the first terminal device is a primary device, and the second terminal device is an assistant device. For example, the first terminal device is a hand-held device, and the second terminal device is a hand-held device or a wearable device of the same user as the first terminal device.

In some examples, if the first terminal device and the second terminal device have a binding relationship, it is determined that the first terminal device and the second terminal device are devices capable of joint positioning.

In an example, a distance between the first terminal device and the second terminal device is within a predetermined distance range. Therefore, in this example, when the first terminal device and the second terminal device are used for joint positioning, the positioning can be more accurate.

In the examples of the present disclosure, the type and number of the first terminal device and the second terminal device are not limited herein.

For example, there is one first terminal device, and there are two or more second terminal devices. For another example, the first terminal device is a mobile phone of user A, and the second terminal device includes: a smart watch and smart glasses of user A. For another example, the first terminal device is the mobile phone of user A, and the second terminal device is a mobile phone of user B, where positions of user A and user B are within a predetermined distance range.

It can be understood that both the first positioning reference signal and the second positioning reference signal are reference signals representing position information, where the first positioning reference signal is used for representing reference position information of the first terminal device, and the second positioning reference signal represents reference position information of the second terminal device. In the examples of the present disclosure, based on the first positioning reference signal and the second positioning reference signal, the position information of the first terminal device can be corrected, that is, based on the position information of the first terminal device and the position information of the second terminal device, the repositioning of the first terminal device is realized. Moreover, the first terminal device and the second terminal device are terminal devices bound to each other. In some application scenes, a distance between the first terminal device and the second terminal device, for example, a mobile phone and a smart watch on a body of the same user, is actually very small. Therefore, it can be considered that the joint positioning of the first terminal device and the second terminal device is realized in the examples of the present disclosure.

Here, the position information is any form of position information. For example, the position information may be latitude and longitude information, or the position information may be Room C on Floor B of Building A. If an office is regarded as a plane coordinate system, the position information can include coordinate point information of the plane coordinate system.

In some examples, the step S13 includes:
determining the position information based on an average of the first positioning reference signal and the second positioning reference signal.

For example, if information carried in the first positioning reference signal is (0, 0), and information carried in the second positioning reference signal is (1, 1), the position information may be (0.5, 0.5).

In other examples, the step S13 includes:
determining the position information based on a weighted average of the first positioning reference signal and the second positioning reference signal.

In an example, the first positioning reference signal has a first weight for calculating the weighted average, and the second positioning reference signal has a second weight for calculating the weighted average, where the first weight is greater than the second weight.

For example, the information carried in the first positioning reference signal is (1, 1), and the information carried in the second positioning reference signal is (2, 2). If the first weight corresponding to the first positioning reference signal is 0.8, and the second weight corresponding to the second positioning reference signal is 0.2, the position information is (1.8, 1.8).

In the examples of the present disclosure, the first weight is determined based on an importance level of the position information of the first terminal device, and the second weight is determined based on an importance level of the position information of the second terminal device.

For example, if, in an underground garage, a binding relationship is established between a first terminal device of user A and a second terminal device of user B, a first weight corresponding to a first positioning reference signal from the first terminal device is 0.8, and a second weight corresponding to a second positioning reference signal from the second terminal device is 0.2. For another example, if, in an office, a binding relationship is established between a first terminal device of user A and a second terminal device of user A, a first weight corresponding to a first positioning reference signal from the first terminal device is 0.6, and a second weight corresponding to a second positioning reference signal from the second terminal device is 0.4.

It can be understood that, in the examples of the present disclosure, the position information of the first terminal device is corrected through the position information of the second terminal device. Therefore, the position information of the first terminal device in the first positioning reference signal is primary, and the position information of the second terminal device in the second positioning reference signal is assistant. Thereby, the first weight is greater than the second weight.

The first weight and the second weight may be determined in various manners, which are not limited herein.

In other examples, the manner for determining the position information in the step S12 may include other various manners, as long as the position information is determined based on the first positioning reference signal and the second positioning reference signal, which is not limited herein.

In an example, the step S14 includes: sending the position information to the first terminal device. Therefore, in this example, the first terminal device can be allowed to learn its own position.

In another example, the step S14 includes: sending the position information to the second terminal device. Therefore, in this example, the second terminal device can be allowed to learn the position of the first terminal device, that is, the assistant device can be allowed to learn the position information of a device assisted by the assistant device in positioning.

In yet another example, the step S14 includes: sending the position information to the first terminal device and the second terminal device. Therefore, in this example, the first terminal device can be allowed to learn its own position, and the assistant device, i.e., the second terminal device, can be allowed to learn the position of the assisted first terminal device.

Therefore, in the examples of the present disclosure, the position information of the first terminal device can be determined through the acquired first positioning reference signal from the first terminal device and second positioning reference signal from the second terminal device, so that the first terminal device can be assisted by the second terminal device to realize the joint positioning of the first terminal device, and improve the positioning accuracy of the first terminal device. In particular, a position of the first terminal device in an indoor environment can be further corrected, which improves the accurate positioning of the first terminal device.

In addition, in the examples of the present disclosure, the position information can be sent to at least one of the first terminal device or the second terminal device, so as to notify the first terminal device and/or the second terminal device of the corrected position information of the first terminal device.

Figure 3:
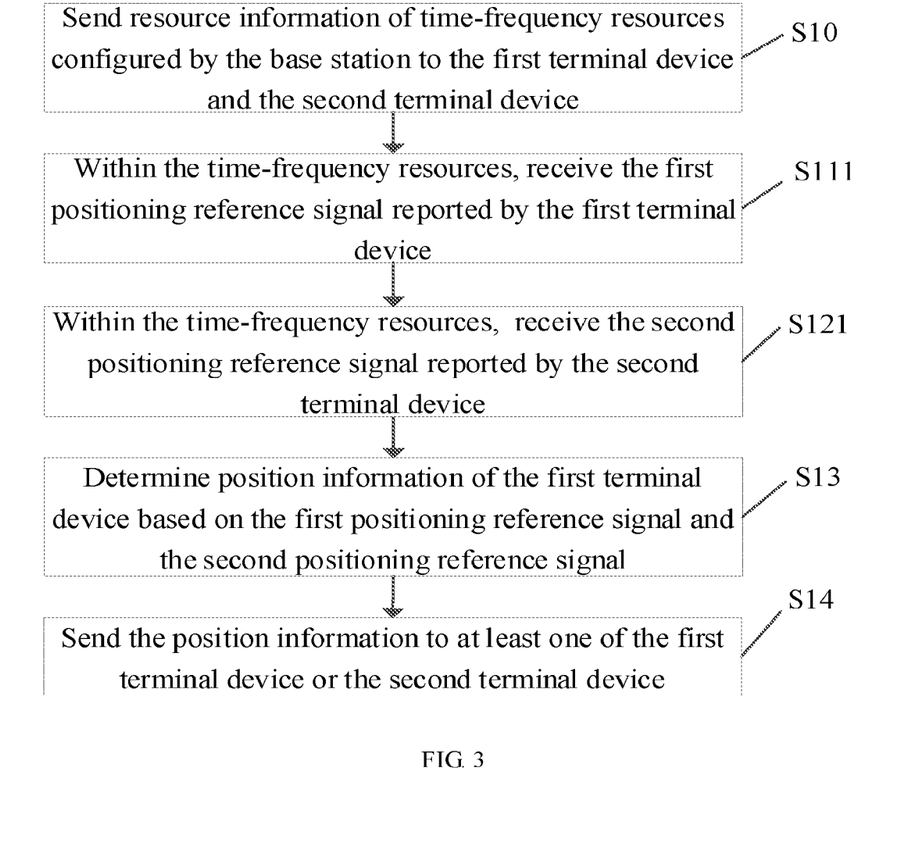
FIG. 3 is a flowchart illustrating a positioning processing method according to an example

As shown in FIG. 3, in some examples, the method includes:
at step S10, resource information of time-frequency resources configured by the base station is sent to the first terminal device and the second terminal device.
The step S11 includes:
at step S111, within the time-frequency resources, the first positioning reference signal reported by the first terminal device is received.
The step S12 includes:
at step S121, within the time-frequency resources, the second positioning reference signal reported by the second terminal device is received.

Here, the resource information of the time-frequency resources may include, but is not limited to, one of position information of the time-frequency resources and identifier information of time-frequency resources.

In an example, the resource information of the time-frequency resources includes: resource information of available time-frequency resources.

In the examples of the present disclosure, the base station sends the resource information of the time-frequency resources to the first terminal device and the second terminal device. Therefore, the first terminal device and the second terminal device can send the first positioning reference signal and the second positioning reference signal respectively based on the time-frequency resources. In this way, it can be ensured that the base station can receive the first positioning reference signal and the second positioning reference signal.

If the time-frequency resources are available time-frequency resources, the time-frequency resource information sent by the base station to the first terminal device and the second terminal device is available time-frequency resource information. In this example, it can be further ensured that the base station can receive the first positioning reference signal and the second positioning reference signal, and the possibility of network transmission congestion can be reduced.

In other examples, the base station can configure a beam propagation direction of signal transmission for the first terminal device and the second terminal device. In an example, the method further includes: sending, by the base station, the beam propagation direction to the first terminal device and the second terminal device; the step S11 includes: in the beam propagation direction, receiving the first positioning reference signal reported by the first terminal device; the step S12 includes: in the beam propagation direction, receiving the second positioning reference signal reported by the second terminal device.

Therefore, in the examples, a beam propagation direction between the base station and the first terminal device and between the base station and the second terminal device can be configured by the base station. The first positioning reference signal and the second positioning reference signal are transmitted based on the beam propagation direction, so that the probability of receiving the first positioning reference signal and the second positioning reference signal is increased.

In some examples, the method further includes:
receiving a registration request; and
binding the first terminal device and the second terminal device based on the registration request.

In an example, receiving the registration request includes: receiving a registration request from the first terminal device.

In another example, receiving the registration request includes: receiving a registration request from the second terminal device.

In yet another example, receiving the registration request includes: receiving registration requests from both the first terminal device and the second terminal device.

Here, the registration request is a request for registering the first terminal device and the second terminal device as a binding relationship.

In the examples of the present disclosure, the binding relationship between the first terminal device and the second terminal device can be pre-established, so that the first terminal device and the second terminal device are registered as devices for joint positioning in the base station. Therefore, in the examples of the present disclosure, the first terminal device and the second terminal device that satisfy the binding relationship can perform joint positioning, that is, the positioning of the first terminal device can be assisted based on the second positioning reference signal from the second terminal device to improve the accurate positioning of the first terminal device.

Here, it should be noted that the following description of a positioning processing method applied to the first terminal device is similar to the above description of the positioning processing method applied to the base station. For technical details that are not disclosed in the examples of the positioning processing method applied to the first terminal device in the present disclosure, reference may be made to the description of the examples of the positioning processing method applied to the base station in the present disclosure, which will not be elaborated herein.

Figure 4:
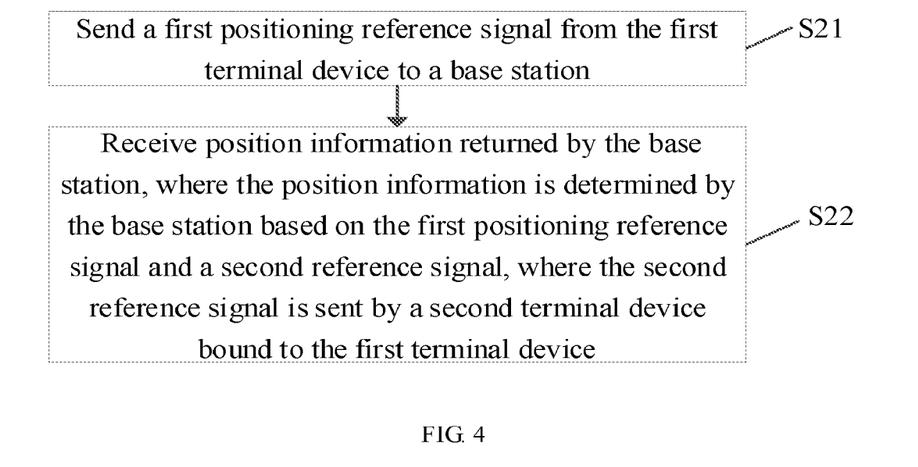
FIG. 4 is a flowchart illustrating a positioning processing method according to an example

As shown in FIG. 4, in an example of the present disclosure, there is provided a positioning processing method, applied to a first terminal device, and including:
at step S21, a first positioning reference signal from the first terminal device is sent to a base station; and
at step S22, position information returned by the base station is received, where the position information is determined by the base station based on the first positioning reference signal and a second positioning reference signal, where the second positioning reference signal is sent by a second terminal device bound to the first terminal device.

In an example, the step S21 includes:
sending the first positioning reference signal from the first terminal device to the base station based on a cellular communication network.
The step S22 includes:
receiving the position information returned by the base station based on the cellular communication network.

In the examples of the present disclosure, an interaction between the first terminal device and the base station is usually implemented through a cellular communication network.

In some examples, the method further includes:
sending a joint positioning request to the second terminal device;

sending the first positioning reference signal from the first terminal device to the base station includes:
if receiving a joint positioning response returned by the second terminal device based on the joint positioning request, sending the first positioning reference signal to the base station.

In the examples of the present disclosure, the first terminal device, before sending the first positioning reference signal to the base station, also sends the joint positioning request to the second terminal device, and if receiving the joint positioning response returned based on the joint positioning request, sends the first positioning reference signal to the base station. Therefore, no joint positioning operation will be performed on the first terminal device and the second terminal device between which no binding relationship has been registered, so that information exchange between the first terminal device and the base station can be reduced, and occupancy of network resources can be saved.

In some examples, sending the joint positioning request to the second terminal device includes:
sending the joint positioning request to the second terminal device based on a cellular communication network; or
sending the joint positioning request to the second terminal device based on a Bluetooth connection.

In some examples, receiving the joint positioning response returned by the second terminal device based on the joint positioning request includes:
receiving the joint positioning response based on the cellular communication network; or
receiving the joint positioning response based on the Bluetooth connection.

In the examples of the present disclosure, it can be understood that a distance between the first terminal device and the second terminal device is within a predetermined distance range, and a Bluetooth signal strength of communication between the first terminal device and the second terminal device based on the Bluetooth connection is greater than a predetermined threshold. Therefore, the information exchange between the first terminal device and the second terminal device can be realized based on a short-range communication manner of the Bluetooth connection.

In the examples of the present disclosure, the information exchange between the first terminal device and the second terminal device can be realized based on a long-range communication manner of the cellular communication network.

In some examples, the method further includes:
send the position information to the second terminal device.

In the examples of the present disclosure, the first terminal device can send the position information to the second terminal device. Therefore, if a communication signal between the base station and the second terminal device is weaker, the position information can be sent to the second terminal device. In the examples of the present disclosure, the first terminal device may send the position information to the second terminal device based on the cellular communication network or the Bluetooth connection.

In some examples, the method further includes:
receiving resource information of time-frequency resources from the base station.
The step S21 includes:
within the time-frequency resources, reporting the first positioning reference signal to the base station.
In the examples of the present disclosure, based on the resource information of the time-frequency resources sent by the base station, within appropriate time-frequency resources, the first positioning reference signal can be sent to the base station, so that the efficiency of receiving the first positioning reference signal by the base station is improved.

Here, it should be noted that the following description of a positioning processing method applied to the second terminal device is similar to the above description of the positioning processing method applied to the base station. For technical details that are not disclosed in the examples of the positioning processing method applied to the second terminal device in the present disclosure, reference may be made to the description of the examples of the positioning processing method applied to the base station in the present disclosure, which will not be elaborated herein.

Figure 5:
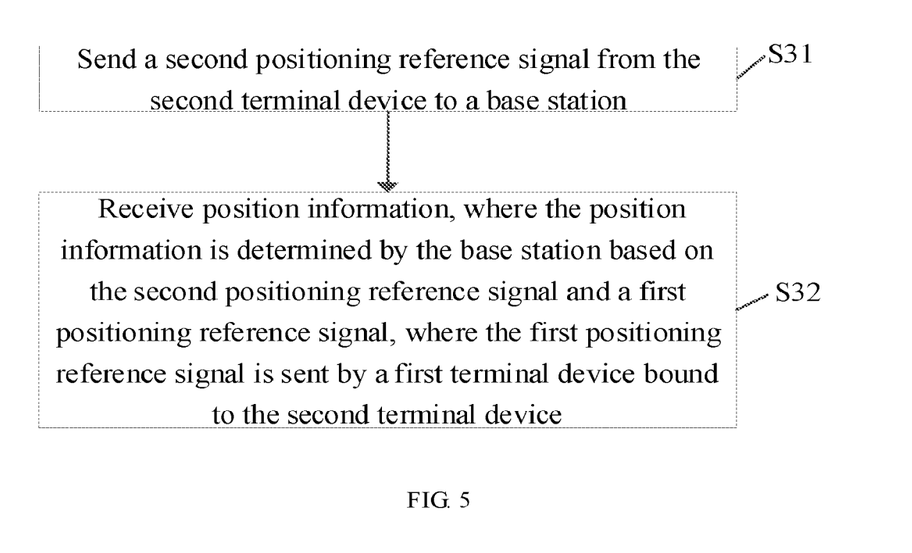
FIG. 5 is a flowchart illustrating a positioning processing method according to an example

As shown in FIG. 5, in an example of the present disclosure, there is provided a positioning processing method, applied to a second terminal device, and including:
at step S31, a second positioning reference signal from the second terminal device is sent to a base station; and
at step S32, position information is received, where the position information is determined by the base station based on the second positioning reference signal and a first positioning reference signal, where the first positioning reference signal is sent by a first terminal device bound to the second terminal device.

In some examples, before the step S31, the method further includes:
receiving a joint positioning request from the first terminal device; and
sending a joint positioning response determined based on the joint positioning request to the first terminal device.

In some examples, receiving the joint positioning request from the first terminal device includes:
receiving the joint positioning request from the first terminal device based on a cellular communication network; or
receiving the joint positioning request from the first terminal device based on a Bluetooth connection.

In some examples, sending the joint positioning response determined based on the joint positioning request to the first terminal device includes:
sending the joint positioning response to the first terminal device based on the cellular communication network; or
sending the joint positioning response to the first terminal device based on the Bluetooth connection.

In some examples, receiving the position information includes:
receiving the position information from the base station.
In other examples, receiving the position information includes:
receiving the position information from the first terminal device.
In some examples, the method further includes:
receiving resource information of time-frequency resources from the base station.
The step S31 includes:
within the time-frequency resources, reporting the second positioning reference signal to the base station.

Figure 6:
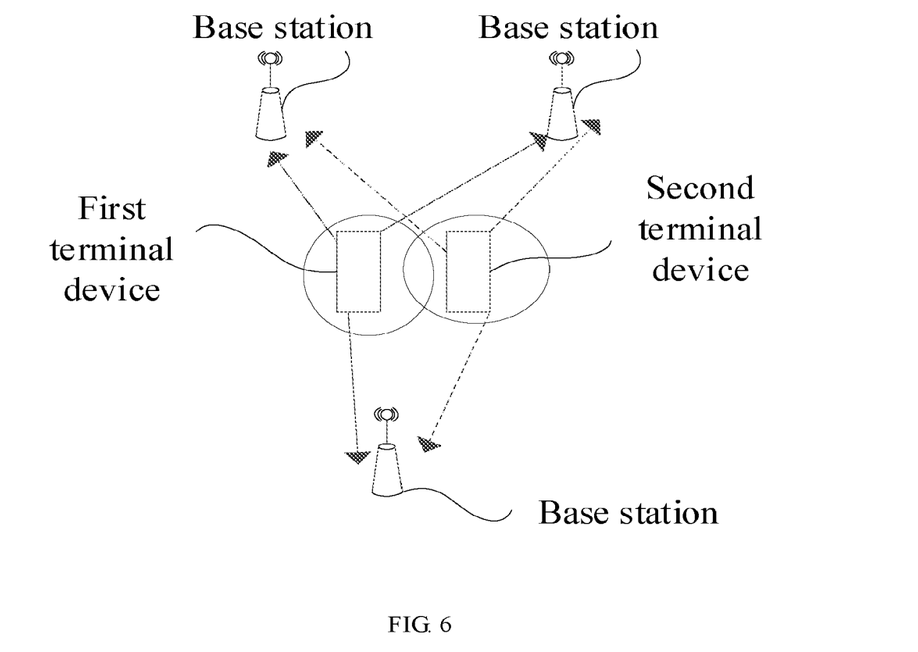
FIG. 6 is a schematic diagram illustrating a positioning processing system according to an example.

In order to facilitate understanding of the above examples of the present disclosure, the following examples are used for description. As shown in FIG. 6, there is provided a scene where a positioning processing method is applied. The positioning processing method is applied to a positioning processing system. The positioning processing system includes: base stations, a first terminal device, and a second terminal device. Here, there are three base stations, and both the first terminal device and the second terminal device establish connections with the base stations.

Figure 7:
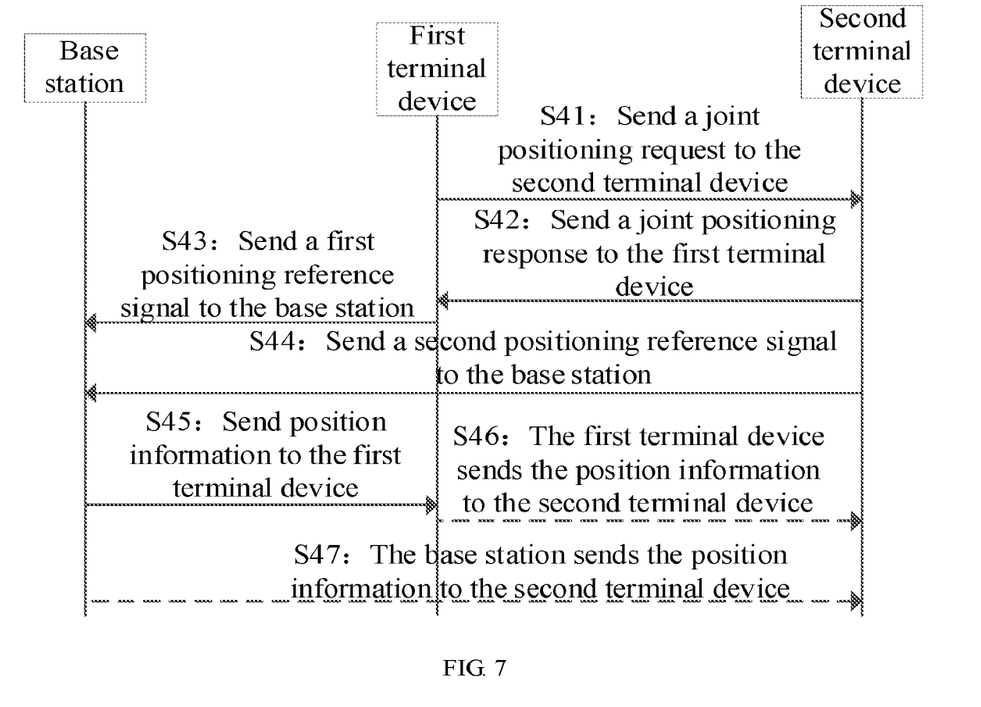
FIG. 7 is a flowchart illustrating a positioning processing method according to an example.

FIG. 7 is a flowchart illustrating a positioning processing method according to an example. The positioning processing method is applied to a positioning processing system. The positioning processing system includes: a base station, a first terminal device, and a second terminal device. The positioning processing method includes the following steps:

At step S41, a joint positioning request is sent to the second terminal device.

In some examples, the first terminal device sends the joint positioning request to the second terminal device.

Here, the first terminal device and the second terminal device are terminal devices that satisfy requirements for joint positioning. That is, the first terminal device and the second terminal device are terminal devices that have pre-established a binding relationship there-between in the base station, and the first terminal device and the second terminal device have completed the registration of joint positioning.

At step S42, a joint positioning response is sent to the first terminal device.

In some examples, the second terminal device sends the joint positioning response based on the joint positioning request to the first terminal device.

Here, in an application scene, the second terminal device, if agreeing to perform joint positioning, returns a joint positioning response to the first terminal device; the second terminal device, if not agreeing to perform joint positioning, does not return information to the first terminal device.

At step S43, a first positioning reference signal is sent to the base station.

In some examples, the first terminal device sends the first positioning reference signal of the first terminal device to the base station.

At step S44, a second positioning reference signal is sent to the base station.

In some examples, the second terminal device sends the second positioning reference signal from the second terminal device to the base station.

At step S45, position information is sent to the first terminal device.

In some examples, the base station determines position information of the first terminal device based on the first positioning reference signal and the second positioning reference signal, and sends the position information to the first terminal device.

In an optional example, the method further includes:
at step S46, the first terminal device sends the position information to the second terminal device.

In some examples, the first terminal device sends the position information to the second terminal device.

Here, the first terminal device can send the position information to the second terminal device based on a Bluetooth connection.

In another optional example, the method further includes:
at step S47, the base station sends the position information to the second terminal device.

In some examples, the base station sends the position information to the second terminal device.

Here, the base station can send the position information to the second terminal device based on a cellular communication network.

In the examples of the present disclosure, it can be understood that, in the steps S41 to S45, determining the position information of the first terminal device based on the first positioning reference signal from the first terminal device and the second positioning reference signal from the second terminal device has been completed. Therefore, in the examples of the present disclosure, the positioning of the first terminal device can be assisted based on the second positioning reference signal from the second terminal device to improve the positioning accuracy of the first terminal device.

In the steps S46 and S47, the second terminal device can be notified of position information of the first terminal device after repositioning, so that the second terminal device is allowed to learn the position information of the first terminal device, which facilitates the second terminal device to perform further processing based on the position information. In FIG. 7, the steps S46 and S47 are shown by dotted lines.

Moreover, it can be understood that, since a distance between the first terminal device and the second terminal device is within a predetermined distance range, for example, the first terminal device and the second terminal device are on a body of the same user, and their distance is smaller than 1 meter, the first terminal device and the second terminal device can exchange information based on a Bluetooth connection. Therefore, the occupation of network communication resources can be reduced.

A distance between the base station and the first terminal device or the second terminal device is longer, so that information exchange can be performed based on a cellular network communication.

Figure 8:
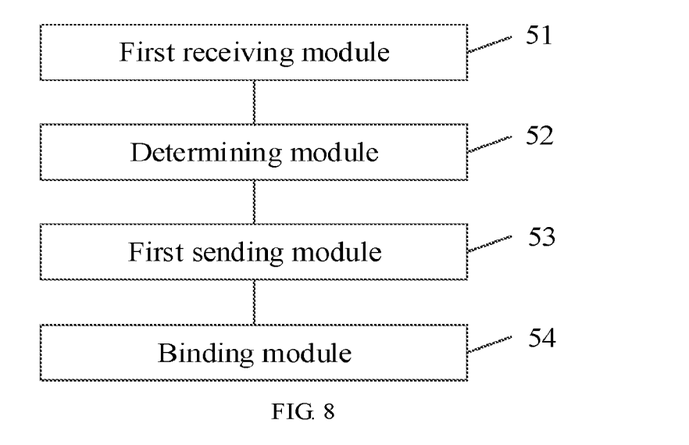
FIG. 8 is a block diagram illustrating a positioning processing apparatus according to an example.

As shown in FIG. 8, in an example of the present disclosure, there is provided a positioning processing apparatus, applied to a base station, and including: a first receiving module 51, a determining module 52, and a first sending module 53.

The first receiving module 51 is configured to receive a first positioning reference signal from a first terminal device, and a second positioning reference signal from a second terminal device bound to the first terminal device.

The determining module 52 is configured to determine position information of the first terminal device based on the first positioning reference signal and the second positioning reference signal.

The first sending module 53 is configured to send the position information to at least one of the first terminal device or the second terminal device.

In some example, the determining module 52 is configured to determine the position information based on a weighted average of the first positioning reference signal and the second positioning reference signal.

In some example, the first positioning reference signal has a first weight for calculating the weighted average, and the second positioning reference signal has a second weight for calculating the weighted average, where the first weight is greater than the second weight.

In some example, the first sending module 53 is configured to send resource information of time-frequency resources configured by the base station to the first terminal device and the second terminal device.

The first receiving module 51 is configured to, within the time-frequency resources, receive the first positioning reference signal reported by the first terminal device and the second positioning reference signal reported by the second terminal device.

In some example, the first receiving module 51 is configured to receive a registration request; and
the apparatus further includes:
a binding module 54, configured to bind the first terminal device and the second terminal device based on the registration request.

Figure 9:
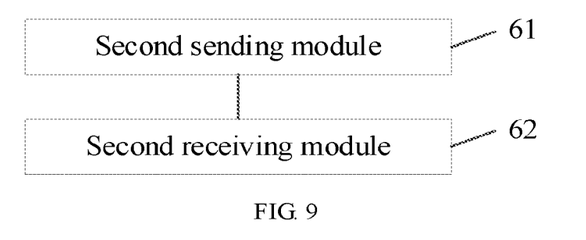
FIG. 9 is a block diagram illustrating a positioning processing apparatus according to an example.

As shown in FIG. 9, in an example of the present disclosure, there is provided a positioning processing apparatus, applied to a first terminal device, and including: a second sending module 61 and a second receiving module 62.

The second sending module 61 is configured to send a first positioning reference signal from the first terminal device to a base station.

The second receiving module 62 is configured to receive position information returned by the base station, where the position information is determined by the base station based on the first positioning reference signal and a second positioning reference signal, where the second positioning reference signal is sent by a second terminal device bound to the first terminal device.

In some examples, the second sending module 61 is configured to send a joint positioning request to the second terminal device.

The second sending module is configured to, if receiving a joint positioning response returned by the second terminal device based on the joint positioning request, send the first positioning reference signal to the base station.

In some examples, the second sending module 61 is configured to send the joint positioning request to the second terminal device based on a cellular communication network, or send the joint positioning request to the second terminal device based on a Bluetooth connection.

In some examples, the second sending module 61 is configured to send the position information to the second terminal device.

In some examples, the second receiving module 62 is configured to receive resource information of time-frequency resources from the base station.

the second sending module is configured to, within the time-frequency resources, report the first positioning reference signal to the base station.

Figure 10:
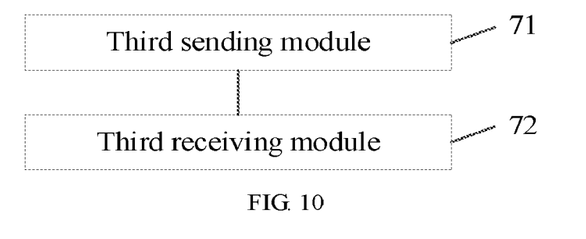
FIG. 10 is a block diagram illustrating a positioning processing apparatus according to an example.

As shown in FIG. 10, in an example of the present disclosure, there is provided a positioning processing apparatus, applied to a second terminal device, and including: a third sending module 71 and a third receiving module 72.

The third sending module 71 is configured to send a second positioning reference signal from the second terminal device to a base station.

The third receiving module 72 is configured to receive position information, where the position information is determined by the base station based on the second positioning reference signal and a first positioning reference signal, where the first positioning reference signal is sent by a first terminal device bound to the second terminal device.

In some examples, the third receiving module 72 is configured to receive a joint positioning request from the first terminal device.

The third sending module 71 is configured to send a joint positioning response determined based on the joint positioning request to the first terminal device.

In some examples, the third receiving module 72 is configured to receive the joint positioning request from the first terminal device based on a cellular communication network, or receive the joint positioning request from the first terminal device based on a Bluetooth connection.

In some examples, the third receiving module 72 is configured to receive the position information from the base station.

In some examples, the third receiving module 72 is configured to receive the position information from the first terminal device.

In some examples, the third receiving module 72 is configured to receive resource information of time-frequency resources from the base station.

The third sending module 71 is configured to, within the time-frequency resources, report the second positioning reference signal to the base station.

Regarding the apparatuses in the above examples, the specific manner in which each module performs operations has been described in detail in the examples of the relevant methods, which will not be elaborated herein.

In an example of the present disclosure, there is provided a base station, including:
  a first processor; and
  a first memory for storing first processor executable instructions, where the first processor is configured to execute the executable instructions to implement a positioning processing method applied to the base station according to any one of the examples of the present disclosure.

In an example of the present disclosure, there is provided a first terminal device, including:
  a second processor; and
  a second memory for storing second processor executable instructions,
  where the second processor is configured to execute the executable instructions to implement a positioning processing method applied to the first terminal device according to any one of the examples of the present disclosure.

In an example of the present disclosure, there is provided a second terminal device, including:
  a third processor; and
  a third memory for storing third processor executable instructions;
  where the third processor is configured to execute the executable instructions to implement a positioning processing method applied to the second terminal device according to any one of the examples of the present disclosure.

The processor (including the first processor, the second processor and/or the third processor) can include various types of storage media, and the storage media are non-transitory computer storage media, which can continue to memorize information stored thereon after communication devices are powered off.

The processor can be connected to the memory (including the first memory, the second memory and/or the third memory) through a bus or the like for reading executable programs stored on the memory, for example, at least one of methods as shown in FIGS. 2 to 5 and FIG. 7.

In an example of the present disclosure, there is provided a computer storage medium having a computer executable program stored thereon, where the executable program is executed by a processor to implement a positioning processing method according to any one of the examples of the present disclosure, for example, at least one of methods as shown in FIGS. 2 to 5 and FIG. 7.

Regarding the apparatuses in the above examples, the specific manner in which each module performs operations has been described in detail in the examples of the relevant methods, which will not be elaborated herein.

Figure 11:
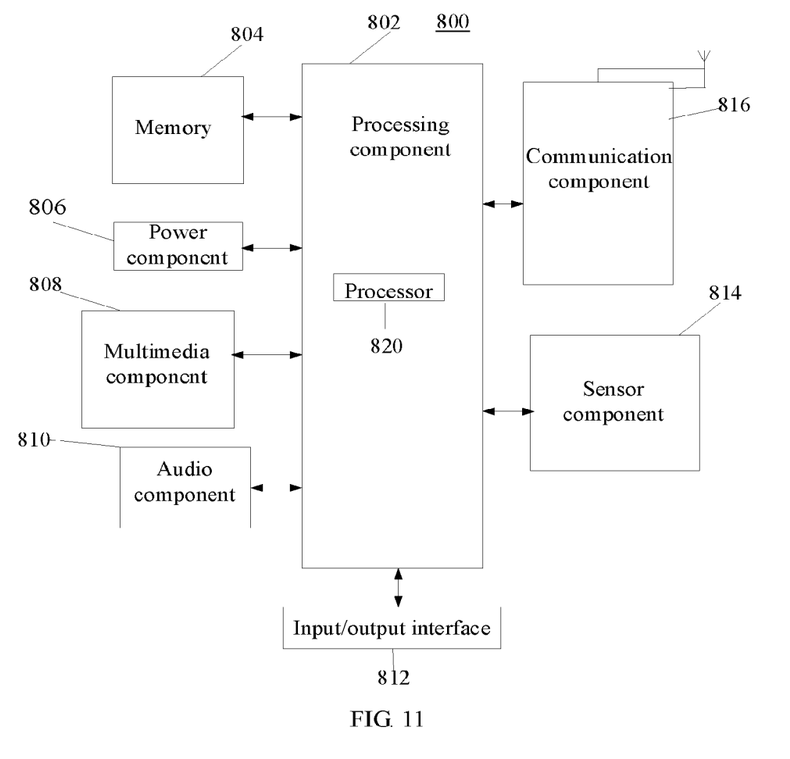
FIG. 11 is a block diagram illustrating user equipment according to an example.

FIG. 11 is a block diagram illustrating user equipment (UE) 800 according to an example. For example, the user equipment 800 may be a mobile phone, a computer, digital broadcast user equipment, a messaging device, a game console, a tablet device, medical equipment, a fitness equipment, a personal digital assistant, etc.

Referring to FIG. 11, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 usually controls the overall operation of the user equipment 800, such as operations associated with display, telephone calls, data communications, camera operations, and recording operations. The processing component 802 may include one or more processors 820 to execute instructions to perform all or part of the steps in the methods described above. Moreover, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the user equipment 800. Examples of these data include instructions for any application or method operating at the user equipment 800, contact data, phone book data, messages, pictures, videos, and the like. The memory 804 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the user equipment 800. The power component 806 may include a power management system, one or more power sources, and other components associated with power generated, managed, and distributed for the user equipment 800.

The multimedia component 808 includes a screen that provides an output interface between the user equipment 800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes a front camera and/or a rear camera. When the user equipment 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the user equipment 800 is in an operation mode, such as a call mode, a recording mode, and a voice recognition mode. The received audio signal may be further stored in the memory 804 or transmitted via the communication component 816. In some examples, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the user equipment 800. For example, the sensor component 814 may detect an open/closed state of the user equipment 800, and the relative positioning of components, for example, the component is a display and a keypad of the user equipment 800. The sensor component 814 may also detect a change in position of the user equipment 800 or a component of the user equipment 800, the presence or absence of a user in contact with the user equipment 800, the orientation or acceleration/deceleration of the user equipment 800 and a change in temperature of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as WiFi, 2G or 3G, or a combination thereof. In an example, the communication component 816 receives broadcast signals or broadcast associated information from an external broadcast management system via a broadcast channel. In an example, the communication component 816 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the user equipment 800 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 804 including instructions, where the instructions are executable by the processor 820 of the user equipment 800 to perform the method as described above. For example, the non-transitory computer readable storage medium may be a ROM, a random access memory (RAM), a CD-ROM, a magnetic tape, a floppy disk, and an optical data storage device.

Figure 12:
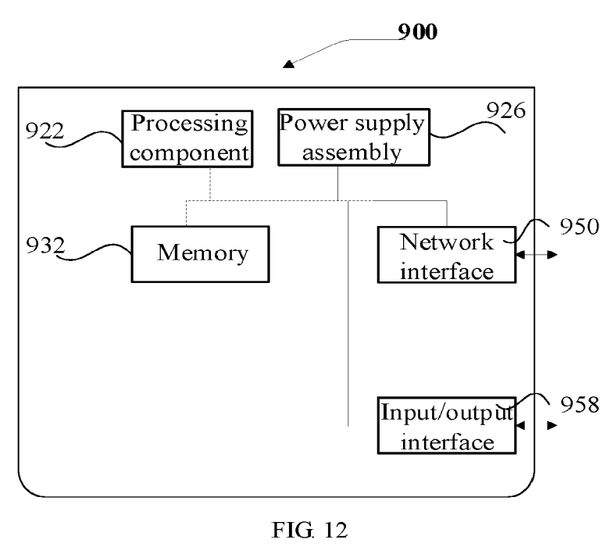
FIG. 12 is a block diagram illustrating a base station according to an example.

As shown in FIG. 12, an example of the present disclosure shows a structure of a base station. For example, a base station 900 may be provided to a network side device. With reference to FIG. 9, the base station 900 includes a processing component 922, which includes one or more processors; and a memory resource represented by a memory 932 for storing instructions executable by the processing component 922, such as application programs. The application programs stored in the memory 932 may include one or more modules, each corresponding to a set of instructions. Furthermore, the processing component 922 is configured to execute the instructions to implement any of the methods applied to the base station, for example, the methods shown in FIGS. 2-3.

The base station 900 may further include a power supply assembly 926 configured to perform power management on the base station 900; a wired or wireless network interface 950 configured to connect the base station 900 to a network; and an input/output (I/O) interface 958. The base station 900 may operate an operating system stored in the memory 932, such as Windows Server™, Mac OS X™, Unix™, Linux™, or FreeBSD™.

Other embodiments of the present disclosure will be readily apparent to those skilled in the art after considering the specification and practicing the contents disclosed herein. The present disclosure is intended to cover any variations, uses, or adaptations of the present invention, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A positioning processing method, comprising:
receiving, by a base station, a first positioning reference signal from a first terminal device;
receiving, by the base station, a second positioning reference signal from a second terminal device bound to the first terminal device;
determining, by the base station, position information of the first terminal device based on the first positioning reference signal and the second positioning reference signal; and
sending, by the base station, the position information to at least one of the first terminal device or the second terminal device.

2. The method according to claim 1, wherein determining the position information of the first terminal device based on the first positioning reference signal and the second positioning reference signal comprises:
determining the position information based on a weighted average of the first positioning reference signal and the second positioning reference signal.

3. The method according to claim 2, wherein the first positioning reference signal has a first weight for calculating the weighted average, and the second positioning reference signal has a second weight for calculating the weighted average, wherein the first weight is greater than the second weight.

4. The method according to claim 1, further comprising:
sending resource information of time-frequency resources configured by the base station to the first terminal device and the second terminal device;
wherein receiving the first positioning reference signal from the first terminal device comprises:
within the time-frequency resources, receiving the first positioning reference signal reported by the first terminal device;
receiving the second positioning reference signal from the second terminal device bound to the first terminal device comprises:
within the time-frequency resources, receiving the second positioning reference signal reported by the second terminal device.

5. The method according to claim 1, further comprising:
receiving a registration request; and
binding the first terminal device and the second terminal device based on the registration request.

6. A positioning processing method, comprising:
sending, by a first terminal device, a first positioning reference signal from the first terminal device to a base station; and
receiving, by the first terminal device, position information returned by the base station, wherein the position information is determined by the base station based on the first positioning reference signal and a second positioning reference signal, wherein the second positioning reference signal is sent by a second terminal device bound to the first terminal device.

7. The method according to claim 6, further comprising:
sending a joint positioning request to the second terminal device;
wherein sending the first positioning reference signal from the first terminal device to the base station comprises:
in response to receiving a joint positioning response returned by the second terminal device based on the joint positioning request, sending the first positioning reference signal to the base station.

8. The method according to claim 7, wherein sending the joint positioning request to the second terminal device comprises:
sending the joint positioning request to the second terminal device based on a cellular communication network; or
sending the joint positioning request to the second terminal device based on a Bluetooth connection.

9. The method according to claim 6, further comprising:
sending the position information to the second terminal device.

10. The method according to claim 6, further comprising:
receiving resource information of time-frequency resources from the base station;
wherein sending the first positioning reference signal from the first terminal device to the base station comprises:
within the time-frequency resources, reporting the first positioning reference signal to the base station.

11. A positioning processing method, comprising:
sending, by a second terminal device, a second positioning reference signal from the second terminal device to a base station; and
receiving, by the second terminal device, position information, wherein the position information is determined by the base station based on the second positioning reference signal and a first positioning reference signal, wherein the first positioning reference signal is sent by a first terminal device bound to the second terminal device.

12. The method according to claim 11, wherein before sending the second positioning reference signal from the second terminal device to the base station, the method further comprises:
receiving a joint positioning request from the first terminal device; and
sending a joint positioning response determined based on the joint positioning request to the first terminal device.

13. The method according to claim 12, wherein receiving the joint positioning request from the first terminal device comprises:
receiving the joint positioning request from the first terminal device based on a cellular communication network; or
receiving the joint positioning request from the first terminal device based on a Bluetooth connection.

14. The method according to claim 11, wherein receiving the position information comprises:
receiving the position information from the base station.

15. The method according to claim 11, wherein receiving the position information comprises:
receiving the position information from the first terminal device.

16. The method according to claim 11, further comprising:
receiving resource information of time-frequency resources from the base station;
wherein sending the second positioning reference signal from the second terminal device to the base station comprises:
within the time-frequency resources, reporting the second positioning reference signal to the base station.

17. A base station, comprising:
a first processor; and
a first memory for storing first processor executable instructions,
wherein the first processor is configured to execute the executable instructions to implement a positioning processing method according to claim 1.

18. A first terminal device, comprising:
a second processor; and
a second memory for storing second processor executable instructions,
wherein the second processor is configured to execute the executable instructions to implement a positioning processing method according to claim 6.

19. A second terminal device, comprising:
a third processor; and
a third memory for storing third processor executable instructions;
wherein the third processor is configured to execute the executable instructions to implement a positioning processing method according to claim 11.

20. A non-transitory computer storage medium having a computer executable program stored thereon, wherein the executable program is executed by a processor to implement a positioning processing method according to claim 1.

* * * * *